United States Patent [19]

Munis

[11] 3,964,829
[45] June 22, 1976

[54] COIN PHOTOGRAPHIC APPARATUS
[76] Inventor: Richard H. Munis, Sawnee Bean Road, Thetford Center, Vt. 05075
[22] Filed: Mar. 18, 1974
[21] Appl. No.: 451,946

[52] U.S. Cl. .................................. 355/75; 355/18; 206/.8; 356/120
[51] Int. Cl.² ........................................ G03B 27/62
[58] Field of Search ................ 355/40, 75, 133, 18; 356/71, 237, 244, 30, 120; 206/.8, .81, .82, .83, .84

[56] References Cited
UNITED STATES PATENTS

| | | |
|---|---|---|
| 689,361 | 12/1901 | Moe ........................................ 355/40 |
| 2,117,516 | 5/1938 | Skidesky .............................. 206/.82 |
| 2,672,977 | 3/1954 | Seitz .................................... 206/.83 |
| 2,839,243 | 6/1958 | Miller .................................. 206/.81 |
| 2,844,248 | 7/1958 | Tiberio ................................. 206/.83 |
| 2,998,126 | 8/1961 | Jenkins ................................. 206/.83 |
| 3,069,001 | 12/1962 | Burdick ................................ 206/.83 |
| 3,515,475 | 6/1970 | Zukor .................................. 356/163 |
| 3,614,237 | 10/1971 | Kyle .................................... 356/169 |
| 3,619,065 | 11/1971 | Agnew ................................. 356/120 |
| 3,762,818 | 10/1973 | Johnson et al. ..................... 356/120 |

*Primary Examiner*—L. T. Hix
*Assistant Examiner*—Alan Mathews
*Attorney, Agent, or Firm*—Wolf, Greenfield & Sacks

[57] ABSTRACT

Coin photographic apparatus has a base to which guides are attached, the latter having slots to receive a slidable support or carriage that has recesses that receive a coin or medal to be photographed. A ruled grid rests on a holder and movable sits on a coin to be photographed. A camera and lighting means are operably associated with said apparatus.

13 Claims, 6 Drawing Figures

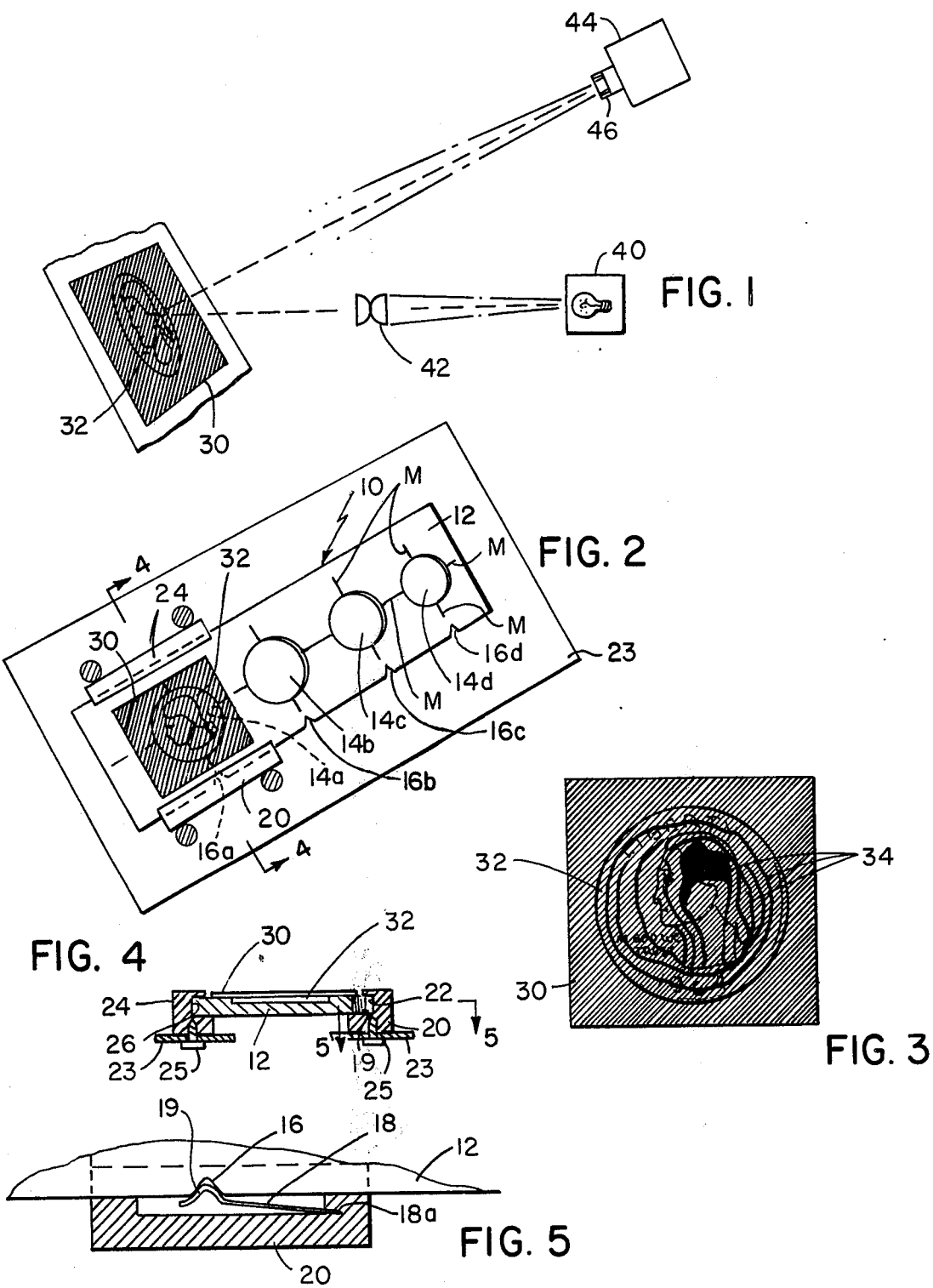

COIN PHOTOGRAPHIC APPARATUS

The principal object of my invention is to enable one to photograph the relief and wear places on a coin that another is allowed to borrow or otherwise have, and upon its return rephotograph it in exactly the same position it was in when first photographed, to thus identify the coin as either the original one or a substitute. This avoids eye strain and great expense as in the use of high-powered microscopes.

Another object is to provide a carriage or support for a coin with recesses that will receive different sizes of coins, and which carriage can be slid to an exact, predetermined position for photographing by means of indents in the carriage and a detent in a guide.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my invention.

In the drawings:

FIG. 1 is a diagrammatic view of my photographic apparatus, and including a camera and lighting means that are positioned for use outside said apparatus.

FIG. 2 is a perspective view; but omitting a grid holder, and showing four posts in cross section that are set in said base.

FIG. 3 is an enlarged, top plan view showing a coin to be photographed and a grid above it.

FIG. 4 is a sectional view taken on the line 4—4 of FIG. 2, omitting the posts.

FIG. 5 is an enlarged, cross sectional view taken on the line 5—5 of FIG. 4, and including a fragmentary view of a coin support, showing a spring positioning bar extending into a detent in the coin support.

Figure 6:
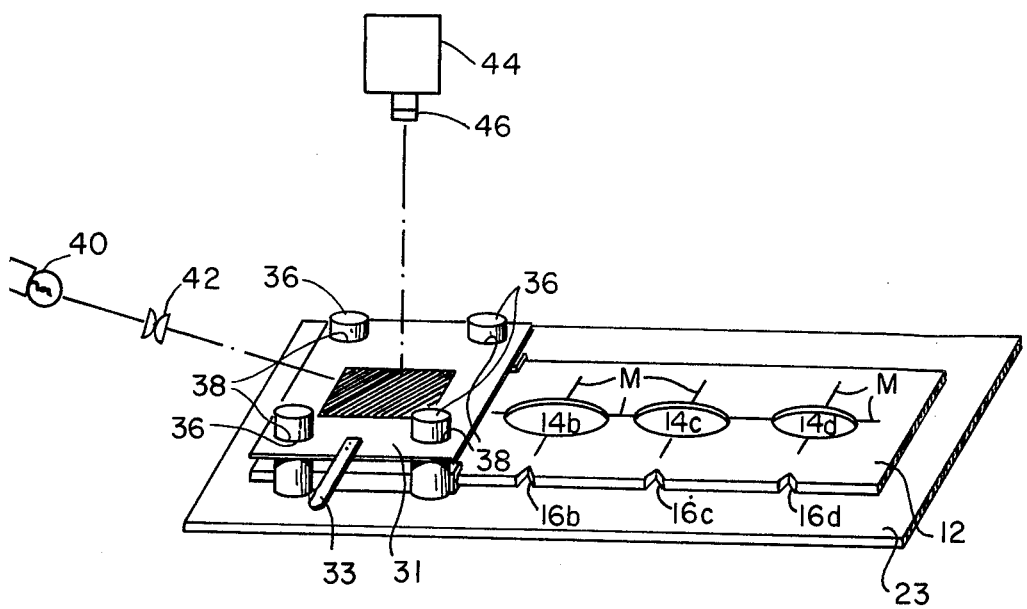
FIG. 6 is an isometric view of my apparatus, including a grid holder with a grid in position of use over a coin recess, and showing a camera and lighting means in positions of use.

As illustrated, my coin photographic apparatus has a coin holding device having a coin support or carriage 12 that is provided with one or more recesses into which a coin or medal fits. In the drawing I show four recesses 14a, 14b, 14c and 14d, of different diameters and depths to receive four sizes of coins or medals. Each recess has one or more fiducial marks M or points so that a coin's design features can be positioned exactly in the same place each time a photograph is to be made. Said carriage 12 has locating indents made along its outside edge positioned opposite each of said recesses, these intents being identified as 16a, 16b, 16c, and 16d on the drawing.

A stationary guide 20 having a cutout or runway 22, is fixed on a base 23, being held by screws 25. This guide is positioned along and outside of one side of said support 12. Another stationary guide 24, having a cutout or runway 26 is similarly fixed in position on said base along and outside of an opposite side of said support. The side portions of said support 12 extend into said cutouts 22 and 26 so that it will freely slide lengthwise in said guide cutouts.

A spring positioning bar 18, which could be made of metal, extends into said cutout 22 and is set in a slit 18a in said guide 20 as shown in said FIG. 5. Said bar 18 has a catch portion 19 that is adapted to enter an indent, such as 16a, as shown in said FIG. 5, thus keeping the slidable coin support in any position selected, depending upon the coin to be photographed.

A well-known grid 30 of glass substrate, that is ruled, sets on a holder 31 that is separate from said coin support 12. This holder with the grid may be kept suspended during movement of said coin support by holding it slightly elevated by means of a lever 33 fixed to it. When the carriage reaches a predetermined position with a coin or medal 32 set in a said recess, said grid will be allowed to rest on a said coin. Since said grid 30 is greater in area than any of said recesses there will be a border portion outside of any coin. Said coin 32 has relief or raised face surfaces 34 which will show in a photograph and which serve to identify the coin.

As shown, four posts 36 are set in said base 12 and they project upwardly, loosely extending through four holes 38 in said holder 31, thus serving to position said holder and grid.

A well-known camera 44 having the usual lens 46 is positioned above said carriage 12, whereby it can be focused on a coin or medal 32 as indicated in said FIGS. 1 and 6. A well-known illuminating means 40, having a condenser 42, is located at an acute angle to said camera lens 46 and can throw a beam of light directly on the entire face of coin 32. Said support is positioned as shown, so that the camera lens will strike said coin perpendicularly.

Said grid has the usual closely spaced parallel lines, such as 150 per inch, which serve to cast shadows on the exposed surface of said coin. The shadows are photographed by said camera 40, thus providing a unique photograph of said coin that identifies it in much the same manner that a person's fingerprint identifies him. This photograph, when compared with another or second taken of the same coin later on in the same position, enables the user to determine whether or not the coin photographed a second time is the identical one that was first photographed. Thus, by means of photography the customary use of a microscope for the same purpose is unnecessary.

In use a coin or medal is placed in one of said recesses in said support 12, and so positioned that a fiducial mark M is opposite a selected portion of said coin. Said support 12 is slid in said runways in said guides until the coin is in predetermined position and said catch portion of said spring bar extends into an indent in said support. Thereafter a photograph is taken with the light shining on the entire face of the coin. When the coin is later to be re-photographed it is first placed in the same recess and the fiducial mark M is opposite the same selected portion as it was first photographed. Said support 12 is slid to the same position as before and a second photograph made. By comparing the two photographs one can tell if the coin is the same in each instance.

What I claim is:

1. Coin photographic apparatus comprising;
   support means for a coin having means for receiving the coin in a predetermined position,
   a light source for directing light onto the coin,
   a camera positioned on the same side of said support means as said light source, a grid disposed intermediate the light source and support means for establishing light contours on the coin that are photographed by the camera, and means for supporting the grid over the coin in a fixed position relative to the coin so that each time a particular type of coin is photographed the coin and grid are maintained in the same relative position.

2. Coin photographic apparatus as set forth in claim 1 wherein said support means has a plurality of recesses of different size to accommodate coins of different denomination, said support means further having at least one fiducial mark adjacent the periphery of each recess.

3. Coin photographic apparatus as set forth in claim 1 including a base and two guide members spacedly secured to said base and for receiving said coin support means.

4. Coin photographic apparatus as set forth in claim 3 wherein said guide members and support means cooperate to hold the coin support means in one of a plurality of different fixed positions.

5. Coin photographic apparatus as set forth in claim 4 wherein said grid supporting means includes a grid holder and means extending from the base for positioning the grid holder in fixed relationship to the coin support means.

6. Coin photographic apparatus as set forth in claim 5 wherein said means for positioning the grid holder includes a plurality of posts fixed to said base, said grid holder having holes threrthrough and said posts extending into said holes whereby said grid holder may be placed in predetermined position.

7. Coin photographic apparatus as set forth in claim 1 wherein said camera is positioned perpendicularly to the face of said grid and said light source is positioned at an acute angle to the camera and such that a beam of light therefrom extends on a line directly diagonal to said grid.

8. Coin photographic apparatus as set forth in claim 1 wherein said coin support means and grid are disposed in a flat condition with said camera positioned directly over said grid and said light source positioned diagonally of said grid and being at an acute angle to said camera.

9. Coin photographic apparatus as set forth in claim 1 including common support means for said grid support means and said coin support means so as to maintain said grid and coin support means in fixed relative position when photographing and rephotographing.

10. Coin photographic apparatus as set forth in claim 9 wherein said common support means includes a base and means extending from the base for supporting the grid support means.

11. Coin photographic apparatus as set forth in claim 1 wherein said grid supporting means maintains the grid in contact with the coin.

12. Coin photographic apparatus as set forth in claim 1 including a support base for holding the coin support in a fixed position, said grid support means including means extending from the base for supporting the grid over the coin.

13. Coin photographic apparatus comprising a coin support having a recess therein to receive a coin, a grid and a holder therefor, a base and two guide members at opposite sides of and attached to said base and each having a cutout therein, said coin support extending into and being slidable in said cutouts, means extending from the base for supporting the grid and holder so that the grid extends over said recess in position of use, and a spring positioning bar set in one of said guide members and having a catch at one end, coin support having an indent at one side thereof, said catch being adapted to enter said indent when opposite thereto to thereby fixedly position said coin support in predetermined position.

* * * * *